United States Patent [19]
Satoh et al.

[11] 4,194,414
[45] Mar. 25, 1980

[54] PLANETARY SPEED REDUCER

[75] Inventors: Akira Satoh, Susono; Teisuke Ishizaka, Toyama, both of Japan

[73] Assignees: Toyota Jidosha Kogyo Kabushiki Kaisha, Toyota; Kabushiki Kaisha Fujikoshi, Toyama, both of Japan

[21] Appl. No.: 837,885

[22] Filed: Sep. 29, 1977

[30] Foreign Application Priority Data

Oct. 8, 1976 [JP] Japan .................. 51-121055

[51] Int. Cl.² .................. F16H 37/06; F16H 57/00
[52] U.S. Cl. .................. 74/674; 74/665 G; 74/798; 74/405
[58] Field of Search ... 74/665 GA, 665 GD, 665 GB, 74/665 GC, 665 GE, 665 G, 665 F, 665 R, 665 P, 661, 674, 679, 798, 405, 752 A, 752 D, 336

[56] References Cited

U.S. PATENT DOCUMENTS

| | | | |
|---|---|---|---|
| 3,054,306 | 9/1962 | Garnier | 74/665 GA X |
| 3,060,767 | 10/1962 | Parrett | 74/798 |
| 3,126,990 | 3/1964 | Hardman | 74/665 GA X |
| 3,286,852 | 11/1966 | Haulotte | 74/665 GA X |
| 3,548,987 | 12/1970 | Erickson et al. | 74/336 X |
| 3,738,193 | 6/1973 | Sumiyoshi et al. | 74/752 A X |
| 3,844,184 | 10/1974 | Nelson et al. | 74/665 P X |

FOREIGN PATENT DOCUMENTS

| | | | |
|---|---|---|---|
| 2113594 | 10/1972 | Fed. Rep. of Germany | 74/665 |
| 2548614 | 5/1977 | Fed. Rep. of Germany | 74/665 F |
| 966535 | 10/1950 | France | 74/798 |

*Primary Examiner*—Lance Chandler
*Attorney, Agent, or Firm*—Spencer & Kaye

[57] ABSTRACT

A multistage speed reducer for high speed rotation including a planetary roller friction reducer for the first stage reducer and a geared reducer for the second stage reducer, the planetary roller friction reducer having its output shaft also used as the input shaft of the geared reducer. Such an arrangement permits transmission of a very high speed and large horsepower rotation at a relatively high reduction ratio with low noise while at the same time consuming less space. The speed reducer may preferably be equipped with safety means for excessive torques.

12 Claims, 4 Drawing Figures

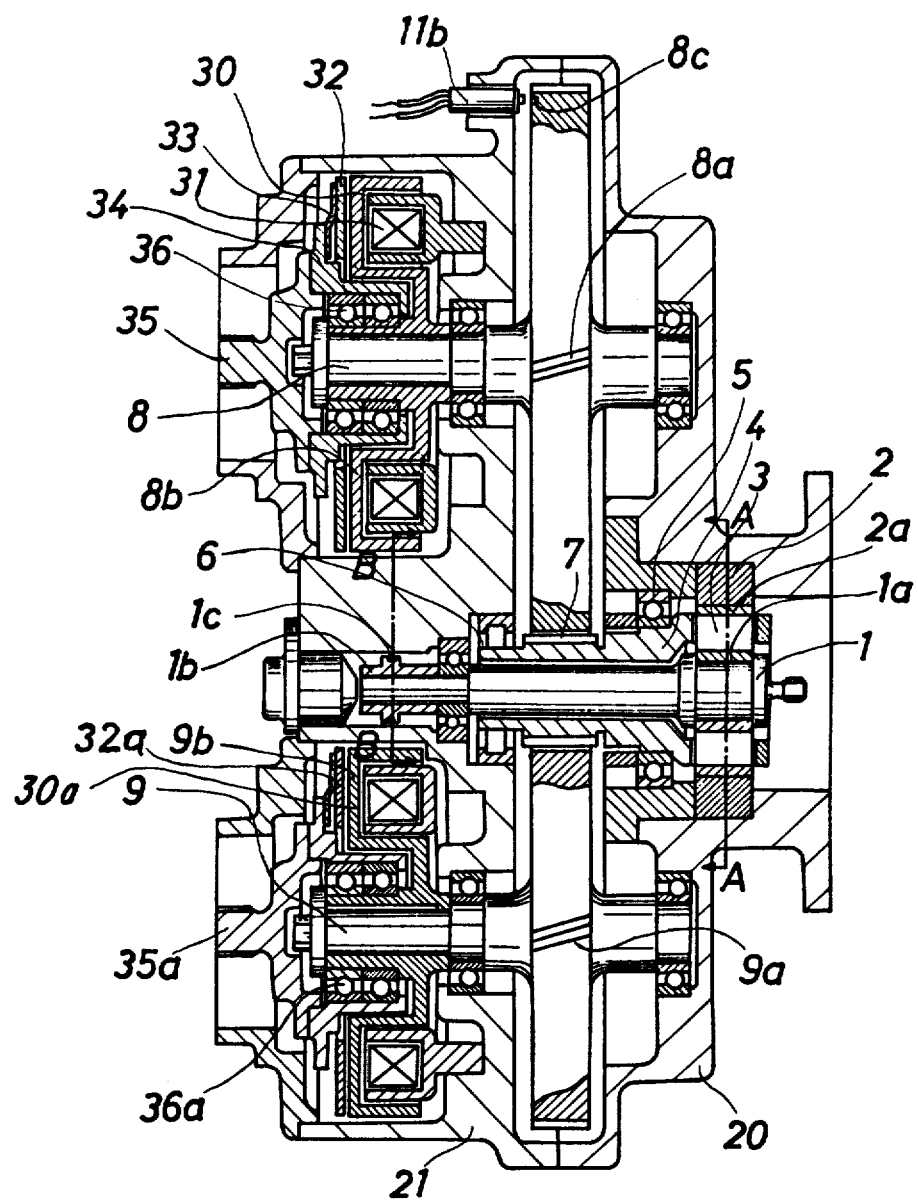

PLANETARY SPEED REDUCER

BACKGROUND OF THE INVENTION

1. Field of the Invention

The invention relates to a multistage speed reducer for high speed rotation and, more particularly, to a multistage speed reducer using a planetary roller friction reducer for the first stage reducer and a geared reducer for the second stage reducer.

2. Description of the Prior Art

In speed reducers for transmitting high speed rotation at a high reduction ratio, generally a combination of multistage reducers has been employed for sequentially reducing the rotation speed, resulting in a space consuming mechanism. Geared reducers are satisfactory in applications for high torque rotation, but it has been found that their usefulness is limited in applications for high speed rotation and they create noise problems. In the arrangement of planetary roller friction reducers in two stages, the second stage reducer necessarily becomes very extensive. Although in planetary roller friction reducers, a normal preload is applied to the rolling surface in accordance with the torque to be transmitted in order to prevent the occurrence of gross slip, an excessive torque will cause gross slip on the rolling surfaces, resulting in heat and seizure generation. This problem becomes serious particularly where a high speed rotation is applied to the input.

BRIEF SUMMARY OF THE INVENTION

It is an object of the present invention to provide an improved speed reducer which can transmit a high speed and large horsepower rotation at a relatively high reduction ratio with less noise and which consumes less space.

Another object of the invention is to provide a high speed rotation speed reducer which can prevent the occurrence of gross slippage to thereby prevent hot running and seizure when exposed to excessive torques and which will be small in size and durable for long use under severe conditions.

These and other objects are accomplished in accordance with the present invention by employing for the first stage reducer a planetary roller friction reducer useful in high speed applications with low noise and for the second stage reducer a geared reducer having a superior torque transmitting capacity.

Other objects and advantages of the present invention will become more apparent from the detailed description of the preferred embodiments which follow.

BRIEF DESCRIPTION OF THE DRAWINGS

In the detailed description of the preferred embodiments presented below, reference is made to the accompanying drawings wherein corresponding parts are identified by like numerals and in which:

FIG. 1 is a vertical sectional view of one embodiment of a speed reducer according to the present invention;

DESCRIPTION OF THE PREFERRED EMBODIMENTS

Figure 1A:
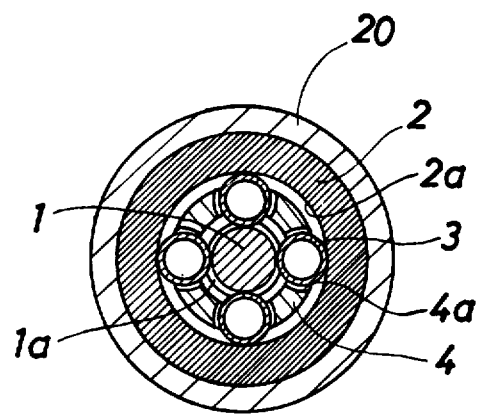
FIG. 1a is a sectional view taken along the line A—A of FIG. 1.

Referring now to the drawings, and initially to FIGS. 1 and 1a thereof, there is illustrated one embodiment of a speed reducer made in accordance with the present invention. The speed reducer comprises for the first stage reducer a planetary roller friction reducer having its input shaft 1 formed thereon with a rolling track 1a. The planetary roller friction reducer includes a fixed outer ring or wheel 2 contained in a casing 20 and formed on its inner surface with a rolling track 2a. Between the rolling tracks 1a and 2a, there are placed a plurality of hollow cylindrical planet rollers 3 rotatably supported by means of a carrier 4 in its pockets 4a and preloaded in the radial direction according to the torque to be transmitted. The carrier 4 is rotatably supported in a casing 21 by means of a radial ball bearing 5 and a cylindrical roller bearing 6 so as to rotate with revolution of the planet rollers 3 to output the number of orbital revolutions of the planet rollers 3. Integrally formed or keyed to the outer peripheral surface of the carrier 4 is a pinion 7 in mesh with gears 8a and 9a which constitute the second stage speed reducer for transmitting a reduced number of rotations of the carrier 4 to the output shafts 8 and 9 and hence to the output shafts 34 and 35a through electromagnetic clutches 8b and 9b and clutch plates 30 and 30a attached to the shafts 8 and 9, respectively. The electromagnetic clutches 8b and 9b each has a solenoid coil 31 fitted in the casing 21. The clutch plate 32 is connected to a bearing housing 34 through three leaf springs 33 arranged in equally spaced relation circumferentially of the clutch plate 32 such as to move axially relative to the bearing housing 34 but not to move in the direction of rotation thereof. Although two gears 8a and 9a having different teeth numbers are provided in mesh with the pinion 7 of the carrier in the above described embodiment, it is to be understood that only one gear may be provided in mesh with the pinion 7.

Figure 1B:
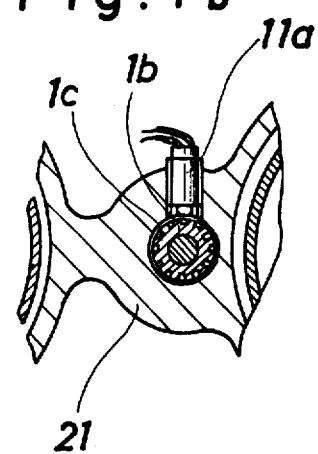
FIG. 1b is a sectional view taken along the line B—B of FIG. 1.

As illustrated in FIGS. 1 and 1b, the input shaft 1 has a sleeve-shaped member 1b secured at one end thereof, the member 1b having formed on its outer surface a plurality of recesses or projections 1c arranged in equally spaced relation. An electromagnetic pickup 11a is secured to the casing near the recesses or projections 1c. The gear 8a has its end face formed with a plurality of recesses or projections 8c in equally spaced relation near which an electromagnetic pickup 11b is secured to the casing. It is to be understood that the recesses or the projections 8c may be formed on the outer peripheral surface of the shaft 8 of the gear instead of the recesses or the projections 8c formed on the end surface of the gear 82. These electromagnetic pickups 11a and 11b are electrically connected to a preset revolution ratio counter (not shown).

In accordance with the present invention, as described above, a planetary roller friction reducer is used for the first stage speed reducer, which permits the speed reducer to operate with less noise and less slippage even where the input shaft track 1a rotates at a very high peripheral speed on the order of 80 to 100 m/sec. Accordingly, the present invention can provide an improved speed reducer which is small in size and long in service life in comparison with the conventional speed reducer employing a planetary geared system for the first stage speed reducer.

The torque transmitted to the second stage speed reducer is increased to $$\text{1st stage transmitted torque} \times \frac{\text{input rev/min of 1st stage}}{\text{input rev/min of 2nd stage}}$$

and thus, if a planetary roller friction reducer is used for the second stage speed reducer as applied in normal practice, the second stage speed reducer will have its size increased to a great extent and its service life limited. In other words, the torque to be transmitted to the input shaft traction truck in a planetary roller friction reducer is given by $$\text{transmitted torque/track radius}$$

and the normal force required for every planetary roller to transmit the torque is expressed by $$\text{transmitted force/number of planet rollers/traction coefficient}$$

Assuming that the traction coefficient is 0.04, the normal force required to be loaded to the rolling surface is 25 times the transmitted force. In view of the above and the fact that the fatigue life of the rolling surface is proportional to the 3/10 power of the normal force, the planetary roller friction reducer system is disadvantageous in service life where large torques are required to be transmitted. In accordance with the present invention, there is provided a geared speed reducer having a superior torque transmitting capacity for the second stage speed reducer in which it is easy to reduce the rotation speed with less noise because the rotation number has already been reduced in the first stage speed reducer. Furthermore, a pinion 7 is provided on the carrier 4 which is commonly used for the output shaft of the first stage speed reducer and the input member for the second stage speed reducer. This eliminates the need for additional parts resulting in a compact structure.

As described above, there has been provided in accordance with the present invention a speed reducer comprising a planetary roller friction reducer useful under high speed and low torque conditions for the first stage speed reducer, a geared reducer useful under medium speed and large torque conditions for the second stage speed reducer, a carrier 4 serving as the output shaft of the planetary roller friction reducer, and a pinion integrally formed with the carrier and serving as the input member of the gear reducer. The speed reducer is effective to convert an extremely high speed rotation to a low or medium speed rotation with less noise. A plurality of gears may be provided in mesh with the pinion 7 to provide two or more outputs.

Although a normal preload is applied to the rolling surface of the planetary roller friction reducer in accordance with the torque to be transmitted as described hereinbefore, a number of problems such as gross slippage on the rolling surface will occur when the rolling surface is subject to excessive torque. In order to prevent the occurrence of gross slippage, a detecting means is provided which includes a plurality of equally spaced recesses or projections 1c formed on the outer peripheral surface of the input shaft 1, a plurality of equally spaced recesses or projections 8c formed on the end face of the gear 8a, and electromagnetic pickups 11a and 11b disposed near the recesses or projections 1c and 8c to generate pulses in proportion to the number of rotations of the input shaft 1 and the gear 8a, respectively. The pulse signal is applied to a preset revolution ratio counter (not shown) to actuate a relay circuit (not shown) so as to cut off current flow through the coils 31 and hence disengage the electromagnetic clutches 8b and 9b attached to the respective output shaft 8 and 9 so that the output shafts 8 and 9 run with no torque relative to the shafts 35 and 35a through the bearings 36 and 36a to remove the loaded torque to the speed reducing section thereby preventing the occurrence of gross slippage in the planetary roller friction reducer.

Figure 2:
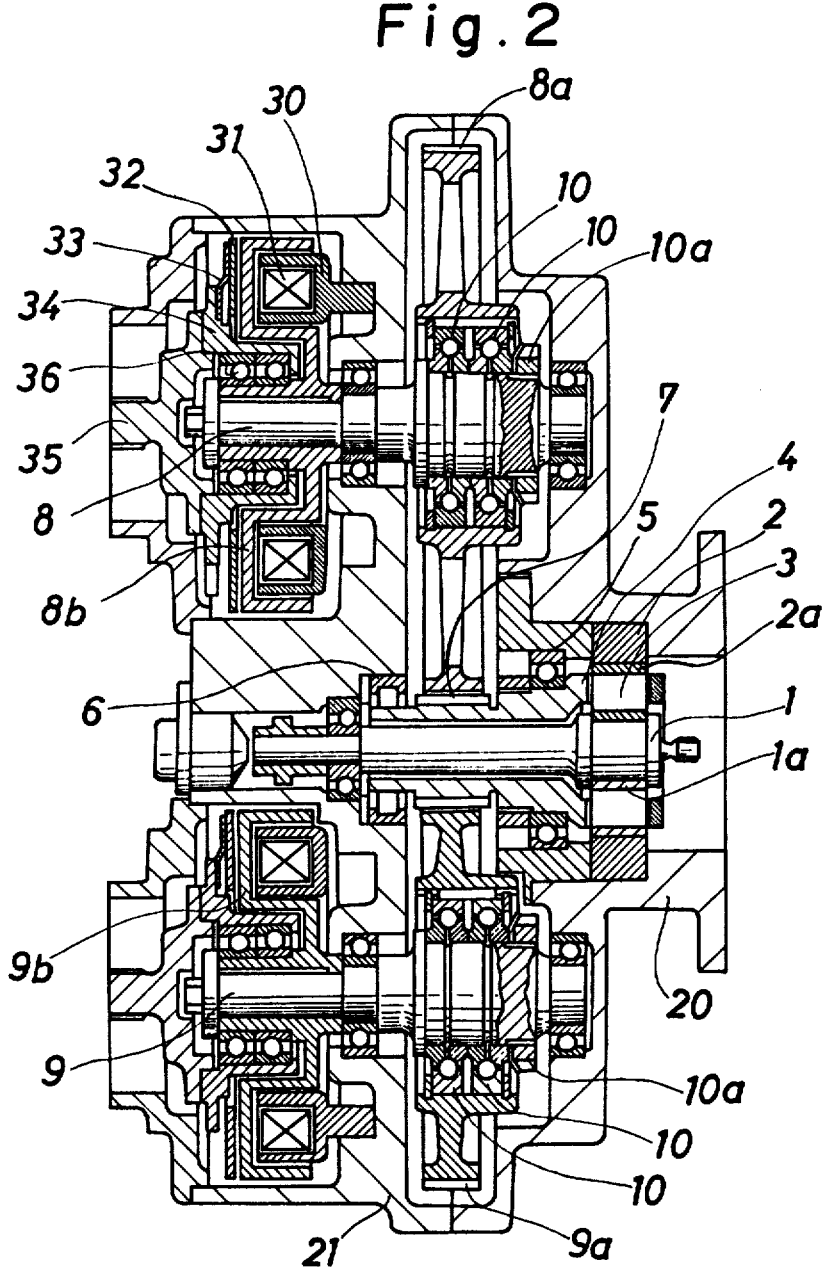
FIG. 2 is a vertical sectional view of an alternative embodiment of a speed reducer according to the present invention.

FIG. 2 illustrates an alternative embodiment according to the present invention in which like parts in FIG. 1 are designated by like reference numerals. In this embodiment, torque limiter means 10 are used instead of the electromagnetic pickups to prevent the occurrence of gross slippage. The gears 8a and 9a are separated from the shafts 8 and 9 and the torque limiter means 10 are each interposed between the corresponding gear and its shaft. Details of the torque limiter means are disclosed in U.S. Pat. No. 3,495,421 issued to Sumiyoshi et al. which is similar in structure to a single row radial ball bearing including an outer ring and a split inner ring, the radius of curvature of the track surface being substantially equal to that of the steel ball so that the outer and inner rings are rotated integrally due to the friction between the inner and outer rings and the steel balls below a predetermined torque. Slippage occurs between the inner and outer rings and the steel balls to cut off the transmission of the torque between the inner and outer rings above the predetermined torque. A desired torque can be obtained by fastening axially the split inner ring to exert a preload. Nuts 10a are provided to adjust the torque limiter means 10 disposed between the gear 8a and its shaft 8 and between the gear 9a and its shaft 9. The torque limiter means is adjusted such that the predetermined torque is slightly less than the transmitted torque of the planetary roller friction, whereby when an excessive torque is temporarily applied, the rolling-sliding action is caused between the innner and outer rings and the steel ball to protect the planetary roller friction reducer from the excessive torque.

As described hereinabove, there has been provided in accordance with the present invention a speed reducer comprising for the first stage speed reducer a planetary roller friction reducer operable with less noise although having an inferior torque transmitting capacity, for the second stage speed reducer a geared reducer having a superior torque transmitting capacity, a carrier serving as the output shaft of the former, and a pinion fixed to the carrier and serving as the input shaft of the latter. The speed reducer can reduce a high speed rotation input at a relatively high reduction ratio with less noise and consumes less space. In the second described embodiment, gross slippage preventing means is provided to overcome the disadvantages found in the planetary roller friction reducer used in the first stage reducer and to prolong the service life thereof.

Adding further for better understanding, in the second embodiment, torque limiter means 10 are each interposed between reducer gears 8a, 9a and their respective shafts. The rolling-sliding action between the inner and outer rings and the steel balls of the torque limiter means 10 has a low in its peripheral speed. Under adequate lubrication, the torque limiter means 10 is durable for long use under severe conditions. If the applied excessive torque is eliminated and return to below normal transmitted torque of the torque limiter means 10, the above described rolling-sliding action between the inner and outer rings and the steel balls is stopped and returns to normal integral rotation thereof.

While the present invention has been particularly shown and described with reference to preferred embodiments thereof, it will be understood that the speed reducer of the present invention can be used as a speed increaser for high speed rotation when the input and output of the speed reducer are used inversely and the expression "speed reducer" includes speed increasers.

In all cases it is understood that the above-described embodiment is merely illustrative of but a small number of the many possible specific embodiments which can represent applications of the principles of the present invention. Numerous and various other arrangements can be readily devised in accordance with these principles by those skilled in the art without departing from the spirit and scope of the invention.

What is claimed is:

1. A speed changer for high speed rotation, comprising:
   a casing;
   a first stage including
   a first shaft having a first rolling track formed on the surface thereof,
   a planetary roller friction reducer comprising a fixed outer ring contained within said casing and surrounding said first shaft adjacent one end of said shaft, said outer ring having a second rolling track formed on the inner surface thereof,
   a planetary roller carrier having a plurality of cavities therein situated between said first and second rolling tracks, said carrier being rotatably supported by said casing and concentric with said first shaft, the other end of said first shaft projecting beyond said carrier, and
   a plurality of hollow cylindrical planetary rollers positioned within respective cavities of said carrier and in rolling contact with said first and second rolling tracks, and rollers being preloaded by an interference fit in the radial direction between said first and second rolling tracks, said carrier and plurality of hollow cylindrical planetary rollers orbitally revolving together about said first shaft; and
   a second stage including
   a pinion formed integrally with said carrier,
   a gear rotatably mounted in mesh with said pinion, and
   a second shaft affixed to said gear, said speed changer functioning as a speed reducer when said first shaft has an input torque applied thereto and said second shaft is connected to an output load, and as a speed increaser when an input torque is applied to said second shaft and an output load connected to said first shaft.

2. A speed changer as set forth in claim 1 which further comprises pickup means coupled to said first shaft for indicating the number of revolutions through which said first shaft has rotated.

3. A speed changer as set forth in claim 2 wherein said pickup means is coupled to said other end of said first shaft.

4. A speed changer as set forth in claim 1 which further comprises means for preventing gross slippage of said output shaft in said planetary roller friction reducer.

5. A speed changer as set forth in claim 14 wherein said means for preventing gross slippage of said output shaft comprises:
   first detecting means for detecting the number of revolutions through which said first shaft has rotated,
   second detecting means for detecting the number of revolutions through which said second shaft has rotated,
   a third shaft,
   a magnetic clutch coupling said second and third shafts, and
   means for operating said magnetic clutch to disconnect said third shaft from said second shaft when the speed reduction ratio of said input shaft relative to said second shaft exceeds a predetermined amount as determined by said first and second detecting means.

6. A speed changer as set forth in claim 5 wherein said first and second detecting means comprise equally spaced projections on the outer peripheral surface of said first shaft and said gear respectively, and wherein said first and second detecting means further comprise first and second electromagnetic pickups respectively disposed adjacent the said first shaft and gear respectively for generating pulse signals in proportion to the number of rotations of said first shaft and said gear.

7. A speed changer for high speed rotation as set forth in claim 1, wherein a plurality of geared reducers are provided.

8. A speed changer for high speed rotation as set forth in claim 7, wherein the plurality of geared reducers have different reduction ratios.

9. A speed reducer for high speed rotation as set forth in claim 4, wherein said gross slip preventing means comprises a first electromagnetic pickup responsive to the number of revolutions of said first shaft for producing pulse signals, a second electromagnetic pickup responsive to the number of revolutions of said gear for producing pulse signals, a preset revolution ratio counter receiving the pulse signals of said first and second electromagnetic pickups, and an electromagnetic clutch attached to said second shaft, said clutch being demagnetized by the output of said preset revolution ratio counter.

10. A speed reducer for high speed rotation as set forth in claim 4, wherein said means for preventing gross slippage comprises a torque limiter interposed between said gear and said second shaft.

11. A speed reducer for high speed rotation as set forth in claim 10, wherein the transmitted torque from the torque limiter is slightly less than that from the planetary roller friction reducer.

12. A speed reducer for high speed rotation as set forth in claim 10, wherein the torque limiter comprises a single row radial ball bearing having an outer ring and a split inner ring.

* * * * *